(12) United States Patent
Fisher et al.

(10) Patent No.: US 9,075,805 B2
(45) Date of Patent: Jul. 7, 2015

(54) METHODS AND APPARATUSES FOR SYNCHRONIZING AND TRACKING CONTENT

(75) Inventors: Clay Fisher, San Diego, CA (US); Eric Edwards, San Jose, CA (US); Neal Manowitz, Montebello, NY (US); Robert Sato, San Diego, CA (US); Brian Beaver, San Francisco, CA (US)

(73) Assignees: SONY CORPORATION, Tokyo (JP); SONY ELECTRONICS, INC., Park Ridge, NJ (US)

( * ) Notice: Subject to any disclaimer, the term of this patent is extended or adjusted under 35 U.S.C. 154(b) by 1857 days.

(21) Appl. No.: 10/771,805

(22) Filed: Feb. 4, 2004

(65) Prior Publication Data
US 2005/0171938 A1   Aug. 4, 2005

(51) Int. Cl.
*G06F 17/30* (2006.01)
(52) U.S. Cl.
CPC .... *G06F 17/30017* (2013.01); *G06F 17/30174* (2013.01)
(58) Field of Classification Search
CPC .................................................. G06F 17/30174
USPC ......... 707/1, 3, 4, 10, 104.1, 610, 758; 705/1; 711/163; 358/1.11
See application file for complete search history.

(56) References Cited

U.S. PATENT DOCUMENTS

| | | | |
|---|---|---|---|
| 5,412,402 A * | 5/1995 | Searby et al. .................. | 345/639 |
| 5,583,980 A | 12/1996 | Anderson ...................... | 345/473 |
| 6,260,049 B1 | 7/2001 | Fitzgerald et al. ........... | 77/104.1 |
| 6,438,320 B1 | 8/2002 | Hatanaka ...................... | 386/117 |
| 7,188,224 B2 * | 3/2007 | Ohta et al. .................... | 711/163 |
| 7,225,197 B2 * | 5/2007 | Lissar et al. .................. | 707/700 |
| 7,526,768 B2 * | 4/2009 | Schleifer et al. ............. | 719/310 |
| 2002/0133508 A1 * | 9/2002 | LaRue et al. .................. | 707/202 |
| 2003/0063304 A1 * | 4/2003 | Satomi et al. ................ | 358/1.11 |
| 2006/0159109 A1 * | 7/2006 | Lamkin et al. ................ | 370/401 |

FOREIGN PATENT DOCUMENTS

| JP | H09-198283 A | 7/1997 |
|---|---|---|
| JP | 2001134474 A | 5/2001 |
| JP | 20110134474 A | 7/2011 |

OTHER PUBLICATIONS

Whitehead Jr., E. James "Goals for a Configuration Management Network Protocol" System Configuration Management. ECOOP SCM Symposium Proceedings, pp. 186-203, Sep. 4, 1999.
Coben, Ellis S. et al. "Version Management in Gypsy" Sigsoft Software Engineering Notes, vol. 13, No. 5, pp. 201-215, Nov. 1988.
(Continued)

*Primary Examiner* — Apu Mofiz
*Assistant Examiner* — Chelcie Daye
(74) *Attorney, Agent, or Firm* — John P. O'Banion (57) ABSTRACT

In one embodiment, the methods and apparatuses synchronizing and tracking content receive a request corresponding to a specific content; review a record associated with the specific content in response to the request; selectively transmit a confirmation for the request based on the reviewing; and perform the request based on receiving the confirmation.

36 Claims, 9 Drawing Sheets

(56) References Cited

OTHER PUBLICATIONS

State Intellectual Property Office, P.R. China, First Office Action issued Aug. 17, 2011, Patent Application No. 200910174779.8, English translation (pp. 1-6), with claims (pp. 7-10), counterpart to PCT/US05/003409, which is a counterpart of, and claims priority to, the instant U.S. Appl. No. 10/771,805, pp. 1-10.

Korean Intellectual Property Office, Notice of Preliminary Rejection issued May 20, 2011, Patent application No. 10-2006-7015548, translation (pp. 1-5), original Korean language copy (pp. 6-12), with claims (pp. 13-17), counterpart to PCT/US2005/003409, claiming priority to U.S. Appl. No. 10/771,805, pp. 1-17.

Japanese Patent Office, Decision of Refusal issued on Jun. 13, 2011, Patent Application No. 2006-552238, translation (pp. 1-5), original Japanese language copy (pp. 6-10), with claims (pp. 11-15), counterpart to PCT/US2005/003409, claiming priority to U.S. Appl. No. 10/771,805, pp. 1-15.

Appeal Board of the Japanese Patent Office, Appeal Decision issued on Feb. 4, 2013, for corresponding Japanese Patent Application No. 2006-552238, counterpart to PCT/US2005/003409, English translation (pp. 1-12), with claims examined (pp. 13-15), and original Japanese language copy (pp. 16-30), pp. 1-30.

Japanese Patent Office, Notice of Ground for Refusal issued on Mar. 28, 2012, for International Patent Application No. 2006-552238, counterpart to PCT/US2005/003409, English translation (pp. 1-5), with claims examined (pp. 6-10), and original Japanese language copy (pp. 11-15), pp. 1-15.

Japanese Patent Office, Notice of Ground for Refusal issued on Mar. 28, 2012, Patent Application 2011-225628, English translation (pp. 1-4), original Japanese language copy (pp. 5-9), with claims (pp. 10-14), counterpart to PCT/US2005/003409, pp. 1-14.

* cited by examiner

METHODS AND APPARATUSES FOR SYNCHRONIZING AND TRACKING CONTENT

FIELD OF THE INVENTION

The present invention relates generally to synchronizing and tracking content and, more particularly, to synchronizing and tracking content based on an awareness of stored content.

BACKGROUND

There has been a proliferation of content utilized by users. This content typically includes documents, audio tracks, video tracks, graphic images, and photographs. In many instances, the content utilized by a user is stored within multiple devices such as computers, personal digital assistants, cellular phones, portable audio players, and digital cameras.

Managing this increasing amount of content is a challenge for many users. For example, duplicates of the same content may exist without an effective way of being aware that duplicates exist. Additionally, multiple versions of related content may exist without the user being aware of related content.

Further, managing content across multiple devices is also a challenge for many users. For example, the user that has content stored across multiple devices typically cannot effectively manage or synchronize the content.

In many cases, users want help in organizing, synchronizing, and protecting their content.

SUMMARY

In one embodiment, the methods and apparatuses synchronizing and tracking content receive a request corresponding to a specific content; review a record associated with the specific content in response to the request; selectively transmit a confirmation for the request based on the reviewing; and perform the request based on receiving the confirmation.

BRIEF DESCRIPTION OF THE DRAWINGS

The accompanying drawings, which are incorporated in and constitute a part of this specification, illustrate and explain one embodiment of the methods and apparatuses for tracking and synchronizing content. In the drawings.

DETAILED DESCRIPTION

The following detailed description of the methods and apparatuses for synchronizing and tracking content refers to the accompanying drawings. The detailed description is not intended to limit the methods and apparatuses for synchronizing and tracking content. Instead, the scope of the methods and apparatuses for synchronizing and tracking content is defined by the appended claims and equivalents. Those skilled in the art will recognize that many other implementations are possible, consistent with the present invention.

References to "content" includes data such as audio, video, text, graphics, and the like, that are embodied in digital or analog electronic form.

Figure 1:
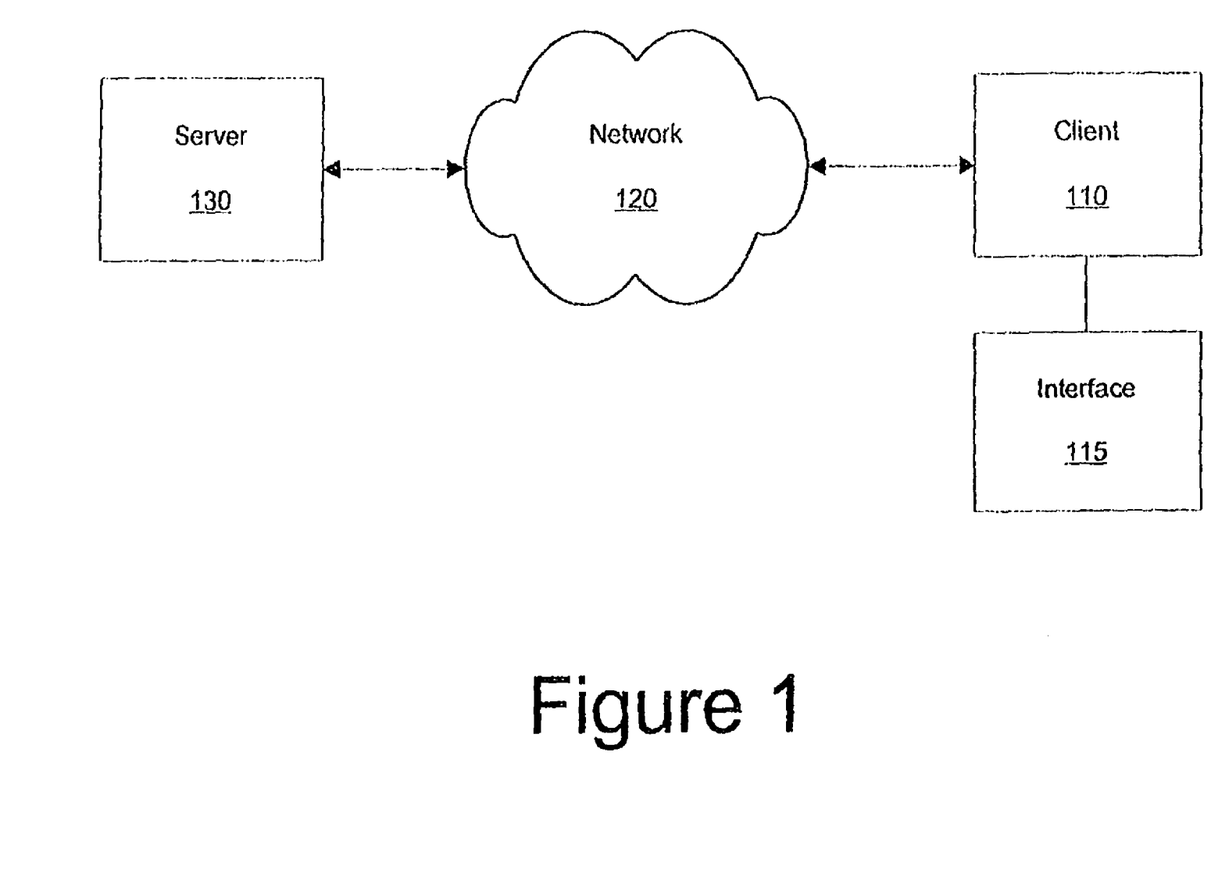
FIG. 1 is a diagram illustrating an environment within which the methods and apparatuses for synchronizing and tracking content are implemented.

FIG. 1 is a diagram illustrating an environment within which the methods and apparatuses for synchronizing and tracking content are implemented. The environment includes an electronic device 110 (e.g., a computing platform configured to act as a client device, such as a personal computer, a personal digital assistant, a cellular telephone, a paging device), a user interface 115, a network 120 (e.g., a local area network, a home network, the Internet), and a server 130 (e.g., a computing platform configured to act as a server).

In one embodiment, one or more user interface 115 components are made integral with the electronic device 110 (e.g., keypad and video display screen input and output interfaces in the same housing as personal digital assistant electronics (e.g., as in a Clie® manufactured by Sony Corporation). In other embodiments, one or more user interface 115 components (e.g., a keyboard, a pointing device (mouse, trackball, etc.), a microphone, a speaker, a display, a camera) are physically separate from, and are conventionally coupled to, electronic device 110. The user utilizes interface 115 to access and control content and applications stored in electronic device 110, server 130, or a remote storage device (not shown) coupled via network 120.

In accordance with the invention, embodiments of synchronizing and tracking content as described below are executed by an electronic processor in electronic device 110, in server 130, or by processors in electronic device 110 and in server 130 acting together. Server 130 is illustrated in FIG. 1 as being a single computing platform, but in other instances are two or more interconnected computing platforms that act as a server.

The methods and apparatuses for synchronizing and tracking content are shown in the context of exemplary embodiments of applications in which content is synchronized and tracked for a user. In one embodiment, the user utilizes content through the electronic device 110 and the network 120. In another embodiment, the content is tracked and synchronized by the application which is located within the server 130 and/or the electronic device 110.

In one embodiment, the methods and apparatuses for synchronizing and tracking content automatically creates a record associated with an individual content indicated by the user. In some instances, information within the record is automatically completed by the methods and apparatuses for synchronizing and tracking content based on previously stored records associated with corresponding content.

In one embodiment, a request by the user to utilize content is granted based on a record associated with the content. In some embodiments, the user utilizes this content by viewing, printing, saving, modifying, moving, and deleting the content. In one instance, the request by the user is confirmed by the user based on the record associated with the content. In yet another embodiment, the request by the user is denied based on the record associated with the content. In yet an additional embodiment, the request by the user is modified based on the record associated with the content.

In one embodiment, the methods and apparatuses for synchronizing and tracking content automatically updates records associated with content based on a record associated with new content.

In one embodiment, the methods and apparatuses for synchronizing and tracking content are located within the electronic device 110 and/or the server 130.

Figure 2:
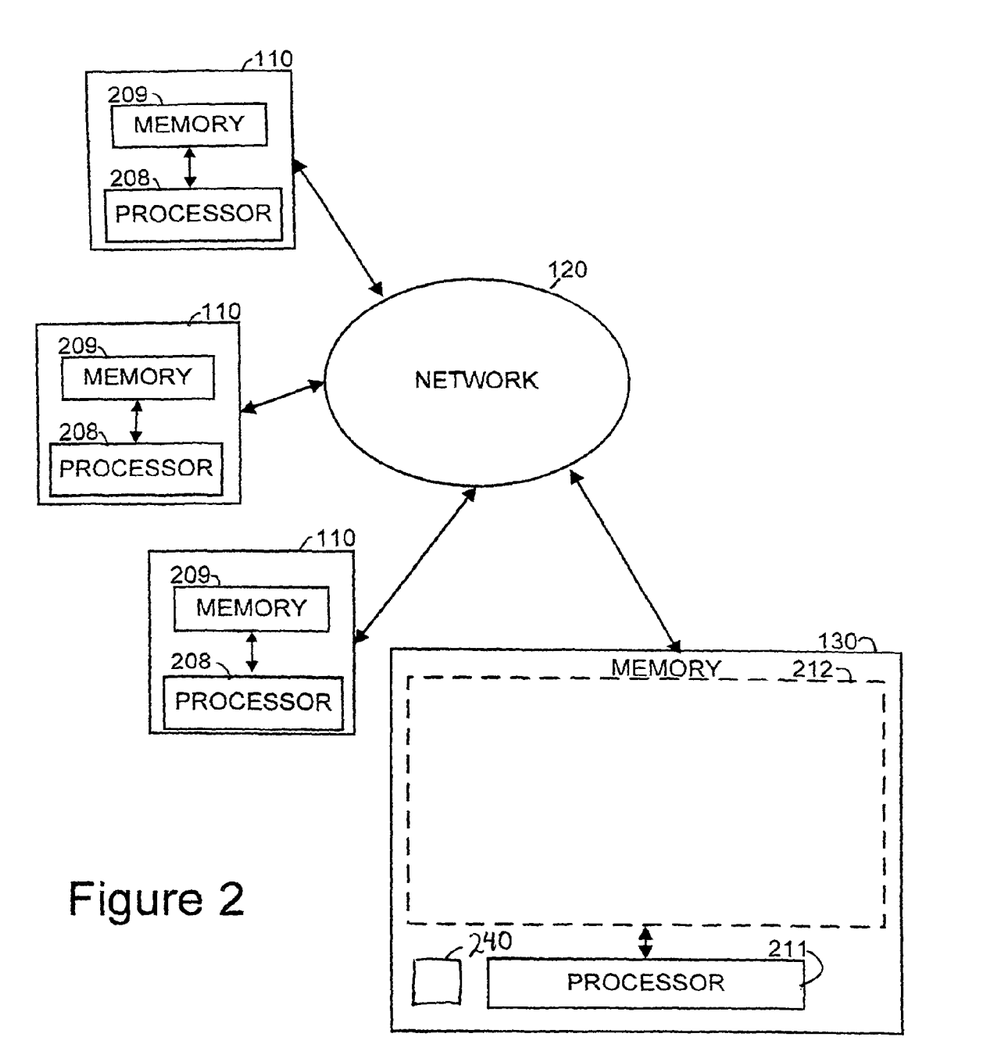
FIG. 2 is a simplified block diagram illustrating one embodiment in which the methods and apparatuses for synchronizing and tracking content are implemented.

FIG. 2 is a simplified diagram illustrating an exemplary architecture in which the methods and apparatuses for synchronizing and tracking content are implemented. The exemplary architecture includes a plurality of electronic devices 110, a server device 130, and a network 120 connecting electronic devices 110 to server 130 and each electronic device 110 to each other. The plurality of electronic devices 110 are each configured to include a computer-readable medium 209, such as random access memory, coupled to an electronic processor 208. Processor 208 executes program instructions stored in the computer-readable medium 209. A unique user operates each electronic device 110 via an interface 115 as described with reference to FIG. 1.

Server device 130 includes a processor 211 coupled to a computer-readable medium 212. In one embodiment, the server device 130 is coupled to one or more additional external or internal devices, such as, without limitation, a secondary data storage element, such as database 240.

In one instance, processors 208 and 211 are manufactured by Intel Corporation, of Santa Clara, Calif. In other instances, other microprocessors are used.

The plurality of client devices 110 and the server 130 include instructions for a customized application for synchronizing and tracking content. In one embodiment, the plurality of computer-readable medium 209 and 212 contain, in part, the customized application. Additionally, the plurality of client devices 110 and the server 130 are configured to receive and transmit electronic messages for use with the customized application. Similarly, the network 120 is configured to transmit electronic messages for use with the customized application.

One or more user applications are stored in memories 209, in memory 211, or a single user application is stored in part in one memory 209 and in part in memory 211. In one instance, a stored user application, regardless of storage location, is made customizable based on synchronizing and tracking content as determined using embodiments described below.

Figure 3:
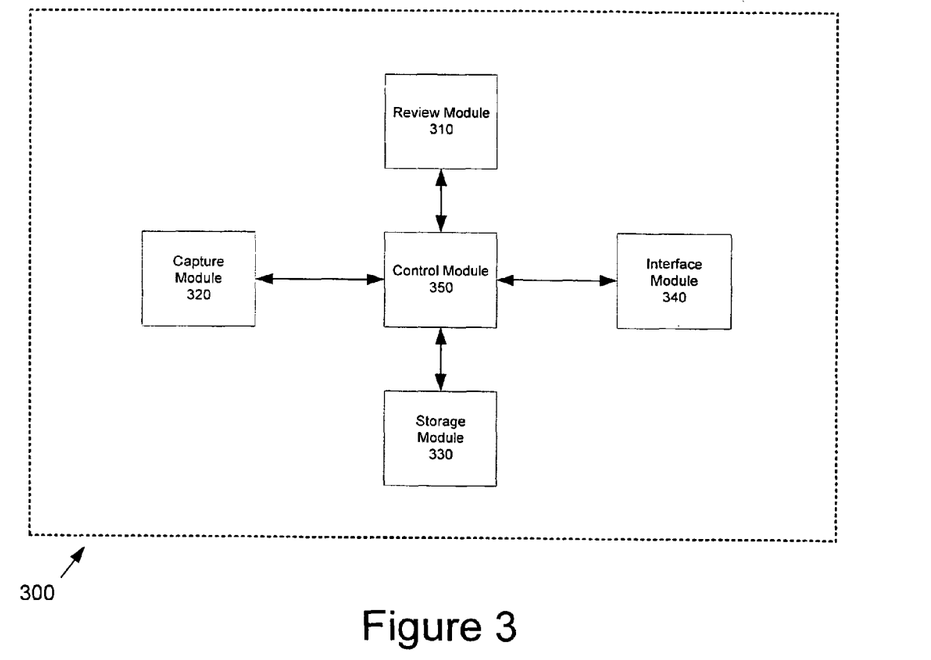
FIG. 3 is a simplified block diagram illustrating a system, consistent with one embodiment of the methods and apparatuses for synchronizing and tracking content.

FIG. 3 illustrates one embodiment of a synchronizing and tracking system 300. The synchronizing and tracking system 300 includes a review module 310, a capture module 320, a storage module 330, an interface module 340, and a control module 350. In one embodiment, the control module 350 communicates with the review module 310, the capture module 320, the storage module 330, and the interface module 340.

In one embodiment, the control module 350 coordinates tasks, requests, and communications between the review module 310, the capture module 320, the storage module 330, and the interface module 340.

In one embodiment, the review module 310 analyzes content and a record associated with the content via the capture module 320. In one embodiment, the review module 310 is configured to analyze the content and the associated record based on a request from the user. In one instance, the request is to copy, delete, modify, view, and save the content. In one embodiment, a preference for each type of request (e.g. copy, delete, modify, view, and save) is utilized to define the criteria that is employed by the review module 310 to allow the request to be completed.

In another embodiment, the review module 310 creates a record for a new content based on other content and their associated records. In some instances, the, the review module 310 analyzes the new content in light of other content and their associated records to automatically complete the fields within the record of the new content.

In yet another embodiment, the review module 310 updates an existing record based on other content and their associated records. In one instance, the, the review module 310 analyzes the record corresponding to the existing content in light of new content and their associated records to automatically update the fields within the existing record of the existing content.

In one embodiment, the capture module 320 identifies specific content and associated record for use by the system 300. In one embodiment, the capture module 320 identifies content that is submitted by the user. In addition, the capture module 320 supplies content and associated record to the review module 310. In one embodiment, the content submitted by the user spans multiple devices. For example, the content identified by the capture module 320 includes content spanning across multiple electronic devices. In one instance, the electronic device 110 includes a digital camera, a computer, an audio media player, and the like.

In one embodiment, the storage module 330 stores a record associated with content. In another embodiment, the storage module 330 also stores the content that is associated with the record. In yet another embodiment, the storage module 330 also stores a preference for each type of request.

In one embodiment, the interface module 340 receives a request from the user of the synchronizing and tracking system 300. For example, in one instance, the user instructs the synchronizing and tracking system 300 to delete a specific content having a record stored within the storage module 330.

In other embodiments, the interface module 340 displays information contained within the record associated with the content.

In yet other embodiments, the interface module 340 interacts with user regarding the user's request. For example, in one instance, the interface module 340 notifies the submitter when the content that the user wanted to delete is the last copy of this content. In another instance, the user provides feedback to the synchronizing and tracking system 300 such as requesting to delete the content regardless of the content being the last copy.

In another embodiment, the interface module 340 interacts with other devices. For example, in some instances, when a request is received to delete content stored within another electronic device, the interface module 340 instructs the electronic device to delay deleting the content until instructed by the system 300.

The synchronizing and tracking system 300 in FIG. 3 is shown for exemplary purposes and is merely one embodiment of the methods and apparatuses for synchronizing and tracking content. Additional modules may be added to the system 300 without departing from the scope of the methods and apparatuses for sequestering content. Similarly, modules may be combined or deleted without departing from the scope of the methods and apparatuses for synchronizing and tracking content.

Figure 4:
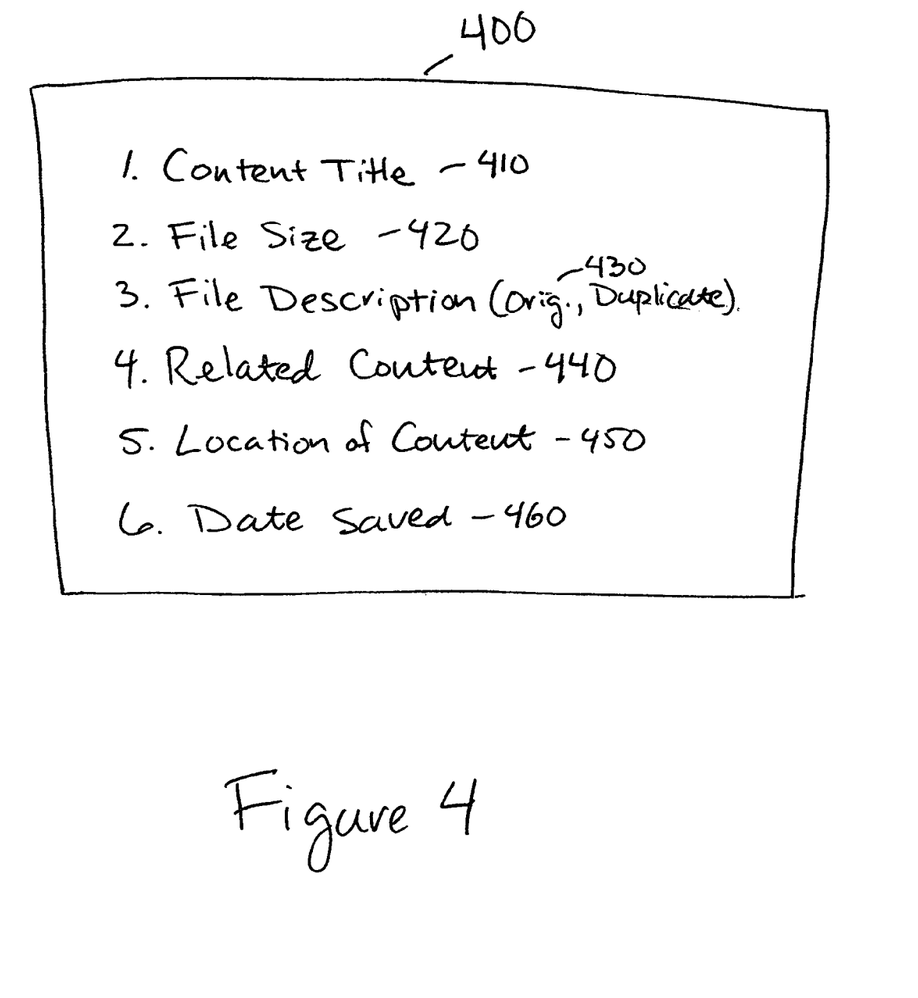
FIG. 4 is an exemplary record consistent with the methods and apparatuses for synchronizing and tracking content.

FIG. 4 illustrates an exemplary record 400 for use with the system 300. The record 400 is associated with a specific content. In some embodiments, the record 400 includes a content identification field 410, a file size field 420, a file description field 430, a related content field 440, a location of content field 450, and a date saved field.

In one embodiment, the content identification field 410 identifies the content. In one instance, the content description field 410 includes a descriptive title for the content. In another instance, the content field 410 includes a unique identification that corresponds to the content.

In one embodiment, the file size field 420 indicates the file size of the content.

In one embodiment, the file description field 430 describes the nature of the content. In some instances, the file description field 430 identifies that the content is an original content, a modified content, a duplicate content, a copyrighted content, and the like.

In one embodiment, the related content field 440 indicates other content that is related to the content associated with the record 400. For example, a duplicate content to the content associated with the record 400 is indicated within the related content field 440.

In one embodiment, the location of content field 450 indicates the location that the content is stored.

In one embodiment, the date saved field 460 indicates the last time that the content was saved. In one embodiment, the date saved field is utilized to determine the original content compared with copies of the original content.

The flow diagrams as depicted in FIGS. 5, 6, 7, 8, and 9 are one embodiment of the methods and apparatuses for synchronizing and tracking content. The blocks within the flow diagrams can be performed in a different sequence without departing from the spirit of the methods and apparatuses for synchronizing and tracking content. Further, blocks can be deleted, added, or combined without departing from the spirit of the methods and apparatuses for synchronizing and tracking content.

Figure 5:
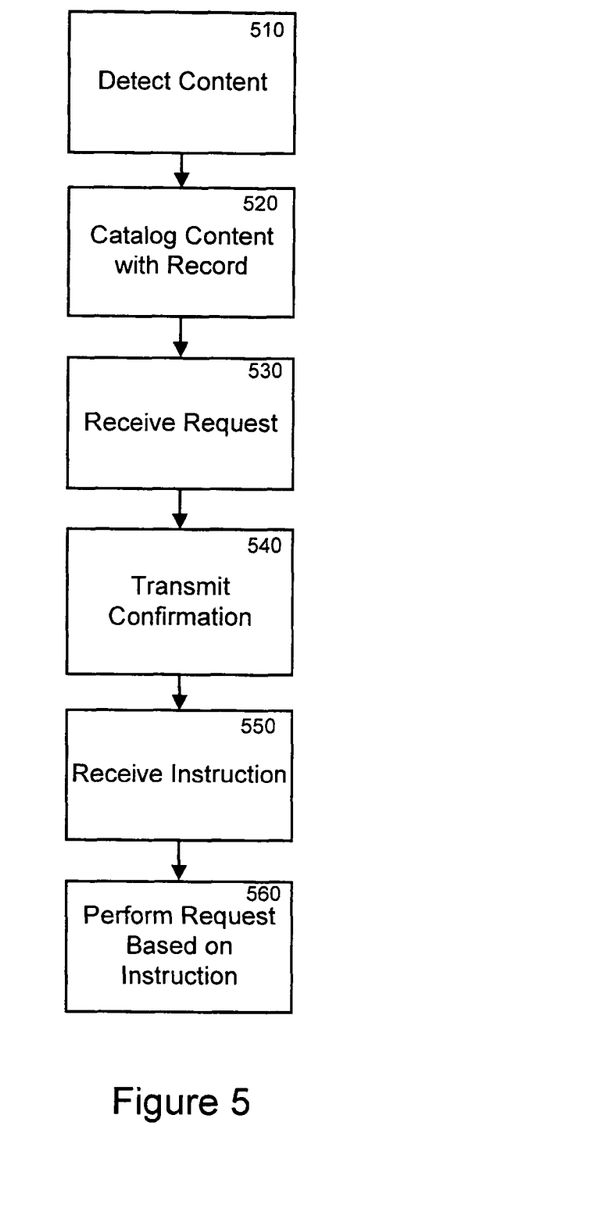
FIG. 5 is a flow diagram consistent with one embodiment of the methods and apparatuses for synchronizing and tracking content.

The flow diagram in FIG. 5 illustrates synchronizing and tracking content according to one embodiment of the invention. In Block 510, content is detected. In some embodiments, the content is detected by the capture module 320 (FIG. 3).

In Block 520, each piece of content is cataloged with a corresponding record. In some embodiments, the record includes information illustrated in the record 400.

In Block 530, a request is received from the user. In some embodiments, the request includes printing, deleting, copying, and modifying the content.

In Block 540, a confirmation is transmitted to the user in response to the request. In some embodiments, the confirmation is formulated based on the request, the record of the specific content, and the records of other content. For example, if the request is to print a specific content (e.g. a photograph) and there is a duplicate of the specific content except at a higher resolution, the confirmation presents the user with an option of printing the specific content from the higher resolution version.

In Block 550, an instruction from the user is received in response to the confirmation.

In Block 560, the request is performed based on the request and the instruction from the user. In one instance, the instruction indicates that the user wishes the higher resolution version of the content be utilized for printing the specific content.

In another embodiment, the Blocks 540 and 550 are omitted, and the request is performed on the specific content based on a preference in the Block 560. For example, the preference is pre-established that indicates the highest resolution copy of the specific content should be utilized when printing the specific content. In this example, once the request to print the specific content is received in the Block 530, the highest resolution copy of the specific content is utilized for printing purposes with no further action from the user.

Figure 6:
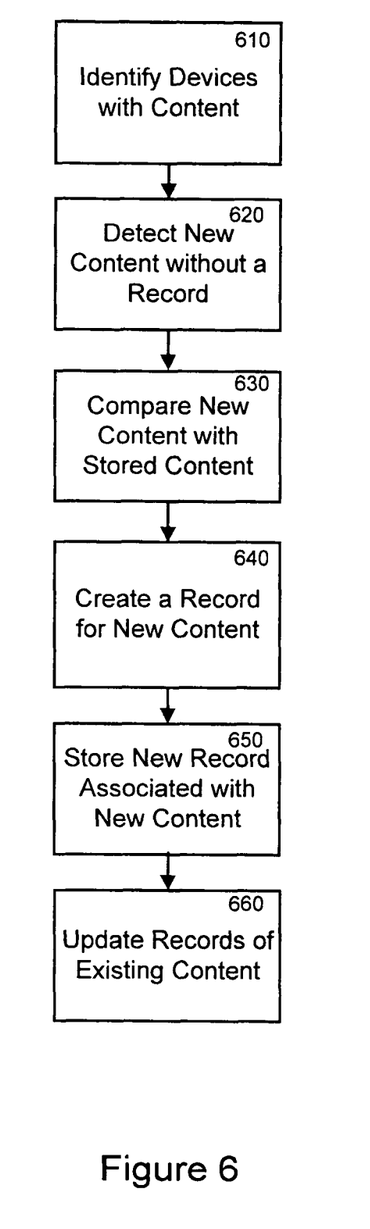
FIG. 6 is a flow diagram consistent with one embodiment of the methods and apparatuses for synchronizing and tracking content.

The flow diagram in FIG. 6 illustrates creating a record for new content according to one embodiment of the invention. In Block 610, electronic devices that store content are identified. In one embodiment, the particular electronic devices are identified by the user. In one embodiment, the electronic device is an audio player, a video player, a computer, and the like.

In Block 620, content without a record is detected. In some embodiments, content that does not have an associated record is considered "new" content to the system.

In Block 630, new content without a record is compared with existing content having a corresponding record. In one embodiment, the new content is compared with the existing content. If the new content is similar or identical to the existing content, this information is utilized in creating a record corresponding to the new content in some embodiments.

In one embodiment, the new content is compared with the existing content via an analysis of the actual content. For instance, if the new content is a digital photograph, the image of the new content is compared against the image of existing content via an image analyzer. In another embodiment, the file size of the new content is compared with the file size of the existing content to compare the similarities between the new content and the existing content.

In Block 640, a record corresponding to the new content is created. In some embodiments, the record is similar to the record 400 shown in FIG. 4. In some embodiments, the record corresponding to the new content is automatically completed based on the information contained within the new content and the comparison between the new content and the existing content. For example, if there are duplicate or related content found by comparing the new content to the existing content, the record of the new content is reflected within the file description field 430 and the related content field 440.

In Block 650, the record corresponding to the new content is stored. In some embodiments, the record is stored within the storage module 330.

In Block 660, records corresponding to existing content is updated based on the record of the new content. For example, if there are duplicate or related content found by comparing the new content to the existing content, records of the existing content are updated within the file description field 430 and the related content field 440.

Figure 7:
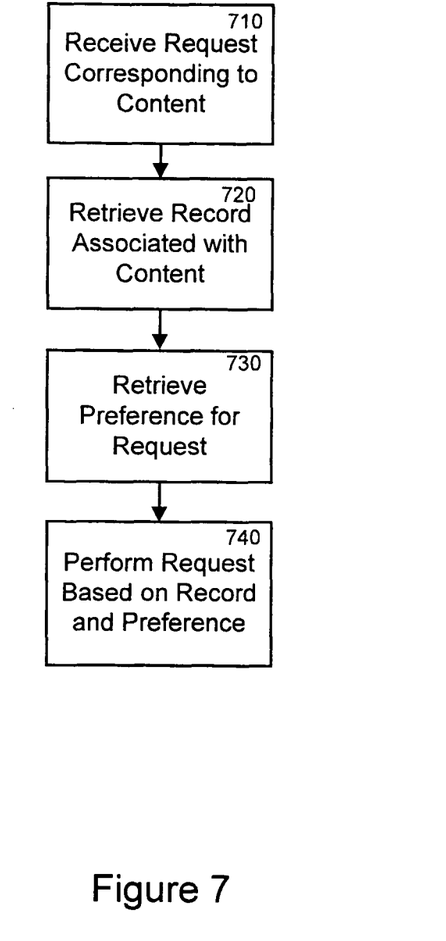
FIG. 7 is a flow diagram consistent with one embodiment of the methods and apparatuses for synchronizing and tracking content.

The flow diagram in FIG. 7 illustrates receiving and performing a request from a user according to one embodiment of the invention. In Block 710, a request corresponding to specific content is received from a user. In some embodiments, the request includes viewing, copying, deleting, modifying, and utilizing the specific content.

In Block 720, a record corresponding to the specific content is located.

In Block 730, a preference corresponding to the request is located. In one embodiment, the preference determines how the request is processed in response to the record corresponding to the specific content. For example, if the user request that the specific content be deleted, and this specific content is the original copy, the preference prevents this deletion from occurring. In some instances, the preference initiates a confirmation to the user confirming that the user wishes to delete the original copy of the specific content. In other instances, the preference does not allow the original copy to be deleted.

In one embodiment, the preference is pre-programmed with default settings to respond to the various requests from the user. In another embodiment, the default settings for the preferences is customizable by the user.

In Block 740, the request is performed based on the record of the specific content and the preference. For example, if the user requests deletion of the specific content and the specific content is a duplicate of the original as noted in the corresponding record, then the specific content is deleted. However, in another embodiment, if the user requests deletion of the specific content and the specific content is an original as noted in the corresponding record, then the specific content is not deleted.

Figure 8:
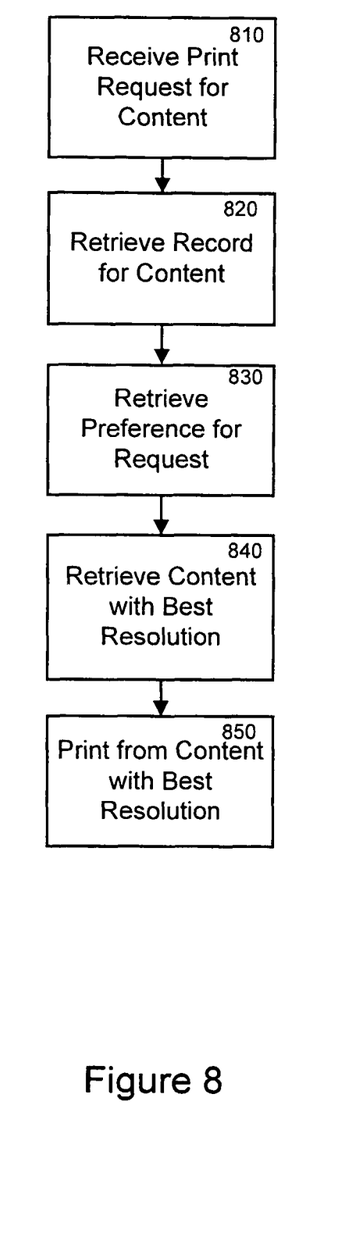
FIG. 8 is a flow diagram consistent with one embodiment of the methods and apparatuses for synchronizing and tracking content.

The flow diagram in FIG. 8 illustrates a specific example of receiving and performing a request from a user according to one embodiment of the invention. In Block 810, a request to print a specific content is received from a user. In one embodiment, the request includes viewing, copying, deleting, modifying, and utilizing the specific content.

In Block 820, a record corresponding to the specific content is retrieved.

In Block 830, a preference corresponding to the request to print the specific content is retrieved. In one embodiment, the preference associated with printing the content finds a copy of the specific content with the highest resolution. In another embodiment, the preference associated with printing the content finds a copy of the specific content with a resolution that matches the resolution of the printer.

In Block 840, the content matching the specific content and having the highest resolution is retrieved. In one embodiment, the content with the highest resolution is the specific content as identified by the user. In another embodiment, the content with the highest resolution is identified through one of the records retrieved in the Block 820.

In Block 850, the content with the highest resolution as specified in the Block 840 is printed through a printer device (not shown).

Figure 9:
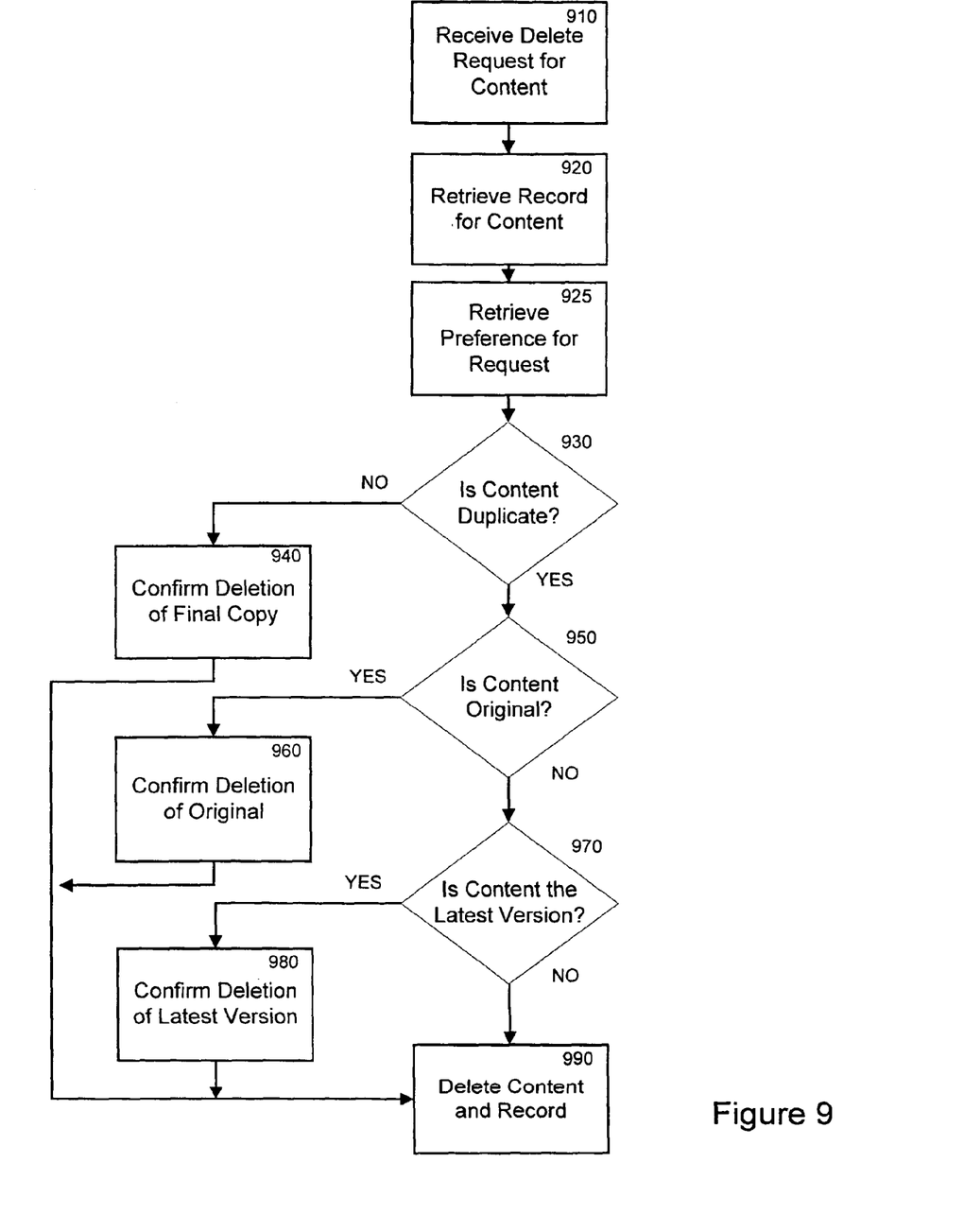
FIG. 9 is a flow diagram consistent with one embodiment of the methods and apparatuses for synchronizing and tracking content.

The flow diagram in FIG. 9 illustrates a specific example of receiving and performing a request from a user according to one embodiment of the invention. In Block 910, a request to delete a specific content is received from a user. In one embodiment, the request includes viewing, copying, printing, modifying, and utilizing the specific content.

In Block 920, a record corresponding to the specific content is retrieved.

In Block 925, a preference corresponding to the request to delete the specific content is retrieved. In one embodiment, Blocks 930, 940, 950, 960, 970, 980, and 990 reflect the preference corresponding to the request to delete the specific content.

In Block 930, a search is performed for a duplicate copy of the specific content. If there are no duplicate copies found, then a confirmation is sought from the user to make sure that the deletion of the specific content is still approved in Block 940.

In Block 950, a check is performed to verify if the specific content is an original copy. If the specific content is the original copy, then a confirmation is sought from the user to make sure that the deletion of the specific content is still approved in Block 960.

In Block 970, a check is performed to verify if the specific content is a latest revised version of the specific content. If the specific content is the latest revised version, then a confirmation is sought from the user to make sure that the deletion of the specific content is still approved in Block 980.

In one embodiment, the record corresponding to the specific content is analyzed to determine whether the specific content is a duplicate copy, an original copy, or a latest version. In another embodiment, the records corresponding to other content is analyzed to determine whether the specific content is a duplicate copy, an original copy, or a latest version. In yet another embodiment, the specific content is compared with other content to determine whether the specific content is a duplicate copy, an original copy, or a latest version.

In Block 990, the specific content and the corresponding record is deleted. If there are duplicate copies of the specific content, the specific content is not the original, and the specific content is not the latest version, then the specific content is deleted in the Block 990 without further interaction in some embodiments. If there are no duplicate copies of the specific content, the specific content is the original, or the specific content is the latest version, then a confirmation is requested from the user prior to deletion of the specific content in some embodiments.

The foregoing descriptions of specific embodiments of the invention have been presented for purposes of illustration and description. For example, the invention is described within the context of creating profiles for modifying digital images as merely one embodiment of the invention. The invention may be applied to a variety of other applications.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed:

1. A method of tracking and synchronizing content containing images across multiple devices, including a plurality of client devices and a server, comprising:

receiving new content for which no record exists, associated with a request submitted by a user;

reviewing said new content in response to the request and comparing image-content with existing content for which a record exists and which is a duplicate or related to said new content;

wherein said comparing includes image analysis between the new content and the existing content;

performing the request and creating a new content record corresponding to said new content;

automatically completing fields within said new content record based on information contained in the new content and said image analysis as well as information about the presence of duplicate or related content which is available on the multiple devices;

wherein new content without an existing record is compared with existing content having a corresponding record, and if the new content is at least similar to existing content, then the records from the existing content are utilized in completing the fields of the new content;

updating the records of duplicate or related content with information about the new content associated with said new content record to synchronize all the content records; and wherein image-content resolution is determined when comparing duplicate or related content.

2. A method as recited in claim 1, further comprising:
receiving a copy, delete, or print request from a user corresponding to specific content within the existing content wherein duplicates of said specific content, or related to said specific content, are retained on a device across multiple devices configured for communicating with one another over a network;
reviewing a record associated with the specific content in response to the request and analyzing the associated record to determine what duplicate or related content is available across the multiple devices;
transmitting a confirmation for the request in response to detecting the presence of any duplicate or related content; and
performing the request in response to receiving the request and instructions from the user in responding to said confirmation.

3. A method as recited in claim 1, further comprising:
receiving a copy, delete, or print request from a user corresponding to said specific content within the existing content wherein duplicates of said specific content, or related to said specific content, are retained on a device across multiple devices configured for communicating with one another over a network;
reviewing a record associated with the specific content in response to the request and analyzing the associated record to determine what duplicate or related content is available across the multiple devices; and
determining utilization of any duplicate or related content based on a pre-established preference and the type of request which was received.

4. A method as recited in claim 1, further comprising:
transmitting a confirmation for the request in response to detecting the presence of any duplicate or related content; and
wherein said confirmation presents the user with options as to which content to use, based on resolution of the content, for performing said request based on the presence of duplicate content.

5. A method as recited in claim 1, wherein each content record includes a field for indicating other content related to content associated with the content record.

6. A method as recited in claim 3, further comprising storing the pre-established preference in a storage device.

7. A method as recited in claim 1, further comprising storing the new content record in a storage device.

8. A method as recited in claim 2, wherein the confirmation is sought from the user for authorization for executing the request.

9. A system for tracking and synchronizing content containing images across multiple devices, including a plurality of client devices and a server, comprising:
an interface module configured for receiving a request submitted by a user specifying new content submitted by the user for which no record exists;
said interface module is configured for communicating over a network between one or more client devices and a server device;
wherein existing content, which is a duplicate and/or related, to said new content are retained across multiple devices configured for communicating over the network;
a review module configured for reviewing said new content and creating a new content record corresponding to said new content based on comparing the new content with existing content, and performing an image analysis;
wherein a content record is associated with existing content, with said content record having information fields for accessing the duplicate content and/or related content;
a storage module configured for storing a preference wherein the preference corresponds to types of request and includes at least one criteria for performing the request;
said review module configured for analyzing existing content and a corresponding content record associated with the request, to find duplicate or related content that is available across the system containing the multiple devices;
said review module automatically completing fields within said new content record based on information contained in existing content as well as information about the presence of duplicate or related content which is available across the multiple devices;
said review module also automatically updates content record fields associated with existing content in response to receipt of new content which is found to be a duplicate or related to the existing content based on said image analysis;
said review module configured for selectively transmitting a confirmation for the request based on the analysis and the presence of duplicate or related content and the preference for determining whether the request is performed; and
said review module executes the request based on receiving the request and instruction from the user in responding to said confirmation.

10. A system as recited in claim 9, further comprising a capture module configured to identify content in response to comparing an image of the new content with images contained in the existing content.

11. A system as recited in claim 9, wherein image-content resolution is determined when comparing duplicate or related content.

12. A system as recited in claim 9, wherein the interface module is configured to provide a confirmation based on the criteria for performing the request as contained in said preference, said confirmation configured for confirming that the user desires to proceed with performing the request.

13. A system as recited in claim 9, wherein the storage module is configured to store the new content record.

14. A system as recited in claim 9, wherein the storage module is configured to store the new content.

15. A system as recited in claim 9, wherein the request includes one from the group of request types consisting of saving, deleting, modifying, and printing of content.

16. A computer-readable medium having computer executable instructions for performing tracking and synchronizing content containing images across multiple devices, including a plurality of client devices and a server, comprising:
receiving a request from a user corresponding to new content submitted by the user for which no record exists across any of the multiple devices;
creating a new content record for said new content submitted by the user for which no record exists;
wherein a content record is associated with existing content, with said content record having information fields for accessing the duplicate content and/or related content;
reviewing existing content records in response to the request and analyzing the associated record and comparing image content using image analysis to determine what duplicate or related content is available across the multiple devices;

automatically completing fields within said new content record based on information contained in the new content and said image analysis as well as information about the presence of duplicate or related content in existing content available across the multiple devices;

automatically updating content record fields associated with existing content in response to receipt of new content which is found to be a duplicate or related to the existing content;

selectively transmitting a confirmation for the request based on said reviewing and the presence of any duplicate or related content;

performing the request based on receiving the request and instruction from the user in responding to said confirmation.

17. A system for synchronizing and tracking content containing images across multiple devices, including a plurality of client devices and a server, comprising:

a server configured for communication over a network;

a client device configured for communication over the network with said server;

an electronic processor in said client device, said server, or in both said client device and said server; and programming executable on said electronic processor for,
receiving a request from a user with new content submitted by the user for which no record exists,
communicating over the network between said client device and said server device and at least one other client device connected to the network,
said new content along with existing duplicate content, and/or related content are retained across multiple client devices configured for communicating over the network,
creating a new content record for said new content submitted by the user,
analyzing the new content and comparing image content using image analysis to find duplicate or related content that is available on devices connected to the network,
automatically completing fields within said new content record based on information contained in the new content and said image analysis as well as information about the presence of duplicate or related content in existing content available across the multiple devices,
automatically updating content record fields associated with existing content in response to receipt of new content which is found to be a duplicate or related to the existing content,
transmitting a confirmation for the request when duplicate or related content is available,
receiving instruction from the user in responding to said confirmation,
executing the request based on instruction.

18. A system for synchronizing and tracking content containing images across multiple devices, including a plurality of client devices and a server, comprising:

a server configured for communication over a network;

a client device configured for communication over the network with said server;

an electronic processor in said client device, said server, or in both said client device and said server; and programming executable on said electronic processor for,
storing a preference setting for one or more types of requests, said preference including at least one criteria for performing the request;
receiving a request from a user with new content submitted by the user for which no record exists,
communicating over the network between said client device and said server and at least one other client device connected to the network,
said new content along with existing duplicate content, and/or related content are retained across multiple client devices configured for communicating over the network,
creating a new content record for said new content submitted by the user,
analyzing the new content and comparing image content using image analysis to find duplicate or related content that is available on devices connected to the network,
automatically completing fields within said new content record based on information contained in the new content and said image analysis as well as information about the presence of duplicate or related content in existing content available across the multiple devices,
automatically updating content record fields associated with existing content in response to receipt of new content which is found to be a duplicate or related to the existing content,
transmitting a confirmation for the request based on the preference setting when duplicate or related content is available,
receiving instruction from the preference setting, and/or from the user in responding to said confirmation, as to how to execute said request,
executing the request in response to said instruction.

19. An apparatus for synchronizing and tracking content containing images across multiple devices, including a plurality of client devices and a server, comprising:

a client device configured for communication over the network with a server and/or at least one other client device;

an electronic processor in said client device; and programming executable on said electronic processor for,
receiving a request from a user with new content submitted by the user for which no record exists,
communicating over the network between said client device and a server and/or at least one other client device connected to the network,
said new content along with existing duplicate content, and/or related content are retained across the server and/or multiple client devices configured for communicating over the network,
creating a new content record for said new content submitted by the user,
analyzing an image in the new content using image analysis to find images of duplicate or related content in the existing content that is available on servers and/or client devices connected to the network,
automatically updating content record fields associated with existing content in response to receipt of new content and said image analysis from which is found duplicate or related content,
transmitting a confirmation for the request when duplicate or related content is available,
receiving instruction from the user in responding to said confirmation,
executing the request based on said instruction.

20. An apparatus for synchronizing and tracking content containing images across multiple devices, including a plurality of client devices and a server, comprising:
- a server configured for communication over a network with client devices;
- an electronic processor in said server; and
- programming executable on said electronic processor for,
  - receiving a request from a user with new content submitted by the user for which no record exists,
  - communicating over the network between said server and at least one said client device connected to the network,
  - said new content along with existing duplicate content, and/or related content are retained across said server and at least one said client device configured for communicating over the network,
  - creating a new content record for said new content submitted by the user,
  - analyzing the new content and comparing image content using image analysis to find duplicate or related content that is retained on client devices connected to the network,
  - automatically completing fields within said new content record based on information contained in the new content and said image analysis as well as information about the presence of duplicate or related content in existing content available across the multiple devices,
  - automatically updating content record fields associated with existing content in response to receipt of new content and said image analysis from which is found duplicate or related content,
  - transmitting a confirmation for the request when duplicate or related content is available,
  - receiving instruction from the user in responding to said confirmation, executing the request based on said instruction.

21. A method of tracking and synchronizing content containing images across multiple devices, including a plurality of client devices and a server, comprising:
- receiving new content for which no record exists, associated with a request submitted by a user;
- reviewing said new content in response to the request and comparing image-content with existing content for which a record exists and which is a duplicate or related to said new content;
- wherein said comparing includes image analysis between the new content and the existing content;
- performing the request and creating a new content record corresponding to said new content;
- automatically completing fields within said new content record based on information contained in the new content and said image analysis as well as information about the presence of duplicate or related content which is available on the multiple devices;
- wherein new content without an existing record is compared with existing content having a corresponding record, and if the new content is at least similar to existing content, then the records from the existing content are utilized in completing the fields of the new content;
- updating the records of duplicate or related content with information about the new content associated with said new content record to synchronize all the content records;
- transmitting a confirmation for the request in response to detecting the presence of any duplicate or related content; and
- wherein said confirmation presents the user with options as to which content to use, based on resolution of the content, for performing said request based on the presence of duplicate content.

22. A method as recited in claim 21, further comprising:
- receiving a copy, delete, or print request from a user corresponding to specific content within the existing content wherein duplicates of said specific content, or related to said specific content, are retained on a device across multiple devices configured for communicating with one another over a network;
- reviewing a record associated with the specific content in response to the request and analyzing the associated record to determine what duplicate or related content is available across the multiple devices;
- transmitting a confirmation for the request in response to detecting the presence of any duplicate or related content; and
- performing the request in response to receiving the request and instructions from the user in responding to said confirmation.

23. A method as recited in claim 21, further comprising:
- receiving a copy, delete, or print request from a user corresponding to said specific content within the existing content wherein duplicates of said specific content, or related to said specific content, are retained on a device across multiple devices configured for communicating with one another over a network;
- reviewing a record associated with the specific content in response to the request and analyzing the associated record to determine what duplicate or related content is available across the multiple devices; and
- determining utilization of any duplicate or related content based on a pre-established preference and the type of request which was received.

24. A method as recited in claim 21, wherein image-content resolution is determined when comparing duplicate or related content.

25. A method as recited in claim 21, wherein each content record includes a field for indicating other content related to content associated with the content record.

26. A method as recited in claim 23, further comprising storing the pre-established preference in a storage device.

27. A method as recited in claim 21, further comprising storing the new content record in a storage device.

28. A method as recited in claim 22, wherein the confirmation is sought from the user for authorization for executing the request.

29. A method of tracking and synchronizing content containing images across multiple devices, including a plurality of client devices and a server, comprising:
- receiving new content for which no record exists, associated with a request submitted by a user;
- reviewing said new content in response to the request and comparing image-content with existing content for which a record exists and which is a duplicate or related to said new content;
- wherein said comparing includes image analysis between the new content and the existing content;
- performing the request and creating a new content record corresponding to said new content;
- automatically completing fields within said new content record based on information contained in the new content and said image analysis as well as information about the presence of duplicate or related content which is available on the multiple devices;

wherein new content without an existing record is compared with existing content having a corresponding record, and if the new content is at least similar to existing content, then the records from the existing content are utilized in completing the fields of the new content;

updating the records of duplicate or related content with information about the new content associated with said new content record to synchronize all the content records; and wherein each content record includes a field for indicating other content related to content associated with the content record.

30. A method as recited in claim 29, further comprising:

receiving a copy, delete, or print request from a user corresponding to specific content within the existing content wherein duplicates of said specific content, or related to said specific content, are retained on a device across multiple devices configured for communicating with one another over a network;

reviewing a record associated with the specific content in response to the request and analyzing the associated record to determine what duplicate or related content is available across the multiple devices;

transmitting a confirmation for the request in response to detecting the presence of any duplicate or related content; and performing the request in response to receiving the request and instructions from the user in responding to said confirmation.

31. A method as recited in claim 29, further comprising:

receiving a copy, delete, or print request from a user corresponding to said specific content within the existing content wherein duplicates of said specific content, or related to said specific content, are retained on a device across multiple devices configured for communicating with one another over a network;

reviewing a record associated with the specific content in response to the request and analyzing the associated record to determine what duplicate or related content is available across the multiple devices; and determining utilization of any duplicate or related content based on a pre-established preference and the type of request which was received.

32. A method as recited in claim 29, further comprising:

transmitting a confirmation for the request in response to detecting the presence of any duplicate or related content; and wherein said confirmation presents the user with options as to which content to use, based on resolution of the content, for performing said request based on the presence of duplicate content.

33. A method as recited in claim 29, wherein image-content resolution is determined when comparing duplicate or related content.

34. A method as recited in claim 31, further comprising storing the pre-established preference in a storage device.

35. A method as recited in claim 29, further comprising storing the new content record in a storage device.

36. A method as recited in claim 30, wherein the confirmation is sought from the user for authorization for executing the request.

\* \* \* \* \*